United States Patent [19]

Nottingham et al.

[11] Patent Number: 5,578,747
[45] Date of Patent: Nov. 26, 1996

[54] DEVICE FOR TESTING IMPERVIOUSNESS OF A FLEXIBLE MEMBRANE MOUNTED ON A RIGID SUPPORT

[75] Inventors: Jon M. Nottingham, Villedieu Le Chaffeau, France; Jean-Mary Jenny, Fribourg, Switzerland

[73] Assignees: Jean-Marie Gatto, London, England; Dominique Bertrand, Morley, Australia

[21] Appl. No.: 462,001

[22] Filed: Jun. 5, 1995

[30] Foreign Application Priority Data

Jun. 6, 1994 [FR] France ................................. 94 06895

[51] Int. Cl.⁶ ........................................................ G01M 3/04
[52] U.S. Cl. ................................ 73/40; 73/40.7; 73/49.8
[58] Field of Search ..................... 73/38, 40, 40.7, 73/49.8

[56] References Cited

U.S. PATENT DOCUMENTS 5,138,871  8/1992  Retta et al. .................................. 73/38

FOREIGN PATENT DOCUMENTS

| 2530813 | 1/1984 | France . |
| 2643713 | 8/1990 | France . |
| 3842392 | 6/1990 | Germany . |
| 2053902 | 2/1990 | Japan . |
| 4151849 | 5/1992 | Japan ......................................... 73/40 |
| 5287601 | 11/1993 | Japan . |
| 1295303 | 11/1972 | United Kingdom ....................... 73/40 |

*Primary Examiner*—Michael Brock
*Attorney, Agent, or Firm*—Pearne, Gordon, McCoy & Granger

[57] ABSTRACT

Device for testing the imperviousness of a flexible membrane (8) used for communications between the outside world and a volume (2) closed by a wall (1). The membrane is seal-connected to a movable box (13), the contents of which may be evacuated. Evolution of the pressure or the concentration of a gas derived from the volume (2) in the box (13) makes it possible to measure any leaks through the membrane (8).

6 Claims, 1 Drawing Sheet

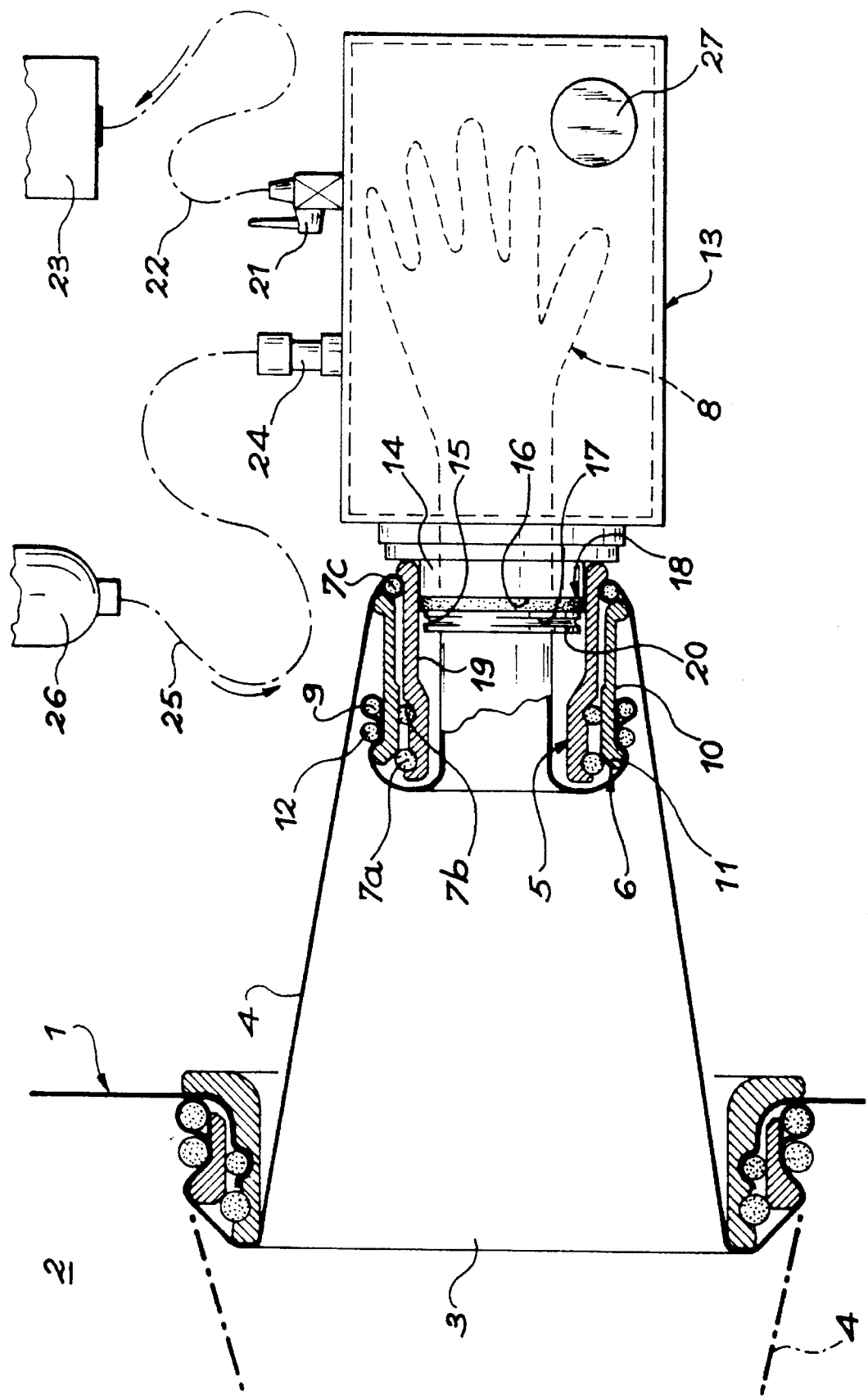

DEVICE FOR TESTING IMPERVIOUSNESS OF A FLEXIBLE MEMBRANE MOUNTED ON A RIGID SUPPORT

FIELD OF THE INVENTION

The invention concerns a device for testing the imperviousness of a flexible membrane mounted on a rigid support and can be used for means frequently employed in containment chambers, such as gloves, half-pressure suits and transfer devices by means of which it is possible to work by hand through the chambers without disturbing the imperviousness of said chambers so as to directly reach tools or other objects in the volumes they enclose. These chambers are used in the pharmaceutical industry.

BACKGROUND OF THE INVENTION

It is clear that these membranes, whose material can break or become porous on aging, are elements which weaken the chamber, namely that they compromise the imperviousness of said chamber. Thus, there is a need to check the continuity of the material of the chamber.

Certain methods for controlling imperviousness are already known as are other techniques for checking the imperviousness of flexible or rubbery membranes, such as gloves. For example, it is possible to place the membrane against a weight able to conduct electricity and having a shape complementary to that of the membrane when in an idle position and bring an electrode near to the other side of the membrane. An electric current moves between the electrode and the weight if the membrane is not sealed. According to one variant of this method able to be used for gloves, a check is made to see if there is a electrostatic load loss between the wearer of the glove and an external electrode. But in all these methods, the membrane is detached from the support on which it is mounted, which is scarcely practical and inadequate for those membranes installed in front of the openings of the protection chambers. It is then necessary to test imperviousness, not only of the membrane, but of the mounting by which the membrane is connected to a collar or similar element of the chamber.

SUMMARY OF THE INVENTION

The main object of the invention is thus to be able to easily test the imperviousness of a membrane in its working position and condition without it being necessary to dismantle it. The test may thus be carried out at any time, even when the chamber is occupied by dangerous substances.

The device of the invention is characterized in that it includes in its most general form a box equipped with a neck to be engaged in a collar for mounting the membrane, the neck including a gasket against the collar and an opening situated in front of the membrane when the neck is engaged, a device for varying the pressure in the box and a device for measuring the gaseous contents of the box. The box and the membrane form a second chamber which is raised to a pressure differing from that existing on the other side of the membrane. The measuring device indicates if leaks, re-establishing the equilibrium of the pressures, through the membrane or its mounting exist.

Certain elements may be added to this basic device so as to render it more effective. This is why it is essential that the box needs to be seal-mounted in the collar otherwise imperviousness control would be impossible or extremely inaccurate. An original device to guarantee this imperviousness between the box and the collar without resorting to taking expensive complicated precautions consists of disposing two grooves joined side by side for receiving the gasket on the neck and of using a movable elastic joint able to jump from one groove to another. This jump occurs when the friction force of the joint against the collar reaches a specific value which corresponds to a pressure force of the joint which is sufficient as previously tested to ensure the desired imperviousness.

Although several methods can be used to follow up evolution of the gaseous contents of the box, it is sometimes necessary to detect extremely weak leak flows. A pressure gauge shall therefore be found to be inadequate and this is why it is recommended to measure the concentration of a gas originally present above the membrane. But a difficulty appears in a normal case where an identical air atmosphere exists on both sides of the membrane. Thus, a particular step is taken, namely of injecting into the box a gas differing from the one detected after having established the vacuum there. Thus, it is possible to create a pure nitrogen atmosphere in the box and measure the evolution of the oxygen concentration.

BRIEF DESCRIPTION OF THE DRAWING

The invention shall now be described with the aid of the sole FIGURE which describes one possible embodiment of the invention.

DETAILED DESCRIPTION OF THE PREFERRED EMBODIMENTS

The FIGURE shows a chamber 1 for containing a volume 2 having dangerous contents. The work operations effected inside the volume 2 from the outside are rendered possible by an opening 3 of the chamber 1 around which installed is a cylindrical or conical sleeve 4 if required, made in this instance of a flexible material like that of the chamber 1. The sleeve 4 is connected to the chamber 1 at one end and bears at its other end a collar device mainly composed of one internal collar 5 and one outer collar 6 which are both concentric and both combined and spaced by two autonomous gaskets 7a and 7b and a third gasket 7c fixed to the end of the sleeve 4. The axial ends of the outer collar 6 are wedged between those of the internal collar 5 by the brace of the gaskets 7a and 7c. The collars 5 and 6 are thus fixed to the sleeve 4. A similar collar system connects the sleeve 4 to the chamber 1.

A glove 8 is installed through the opening 3 and more specifically a toric joint 9 which delimits its orifice is stretched and installed on an external bearing 10 of the outer collar 6 behind an end shoulder 11. Another gasket 12 is inserted between the toric joint 9 and the end shoulder 11 so as to reinforce the contact of the glove 8 on the outer bearing 10 and prohibits the glove from being inadvertently being torn away from the outer collar 6. The details of mounting and the structure of the sleeve 4 shall not be described as these facts are already known. In fact, the invention does not depend directly on these factors and could be used with other systems. It ought to be said that any imperviousness defects could originate from the material of the glove itself 8, but also from plays existing between the glove 8 and the outer bearing 10 despite the presence of the joints 9 and 12.

The glove 8 normally extends towards the volume 2. However, it has been represented when the invention is active and has been shown inside out and turned to the outside of the volume 3, thus reversing the sleeve 4. It then extends outside the collars 5 and 6 and into a box 13 ended by a neck-shaped lengthening piece 14 driven into the internal collar 5. The neck 14 is recessed with one external throat 15 and one rear throat 16 parallel and close to each other and separated solely by a peak 17. A movable joint 18 is associated with said throats. This is an elastic toric joint able to jump over the peak 17 so as to pass from one of the throats 15 or 16 to the other according to the direction of the friction forces it undergoes. When the box 13 is driven into the internal collar 5, the outer circumference of the rolling joint 18 rubs against the internal bearing 19 of this internal collar 5 and the rolling joint 18 moves into the rear throat 16: the person holding the box to drive in the neck 14 feels this jump as he needs to use more force to make the movable joint 18 move onto the peak 17. He is then certain that the compression force of the rolling joint 18 between the neck 14 and the internal collar 5 proportional to the friction force is enough to guarantee imperviousness around the movable joint 18. He then stops driving in the neck 14. The movable joint 18 then returns into the extreme throat 15 when the box 13 is withdrawn from the internal collar 5.

If an opening 20 is excluded at the end of the neck 14 in front of the glove 8 which penetrates into it if it is reversed, the box 13 is sealed, except for two connectors. The first is a valve 21 to which it is possible to connect the suction pipe 22 of a vacuum pump 23 so as to fully remove the gaseous contents of the box 13. The second connector is an end piece 24 to which it is possible to connect a pipe 25 for feeding a nitrogen bottle 26 or feeding another gas if circumstances justify. Finally, an oxygen analyzer 27, or here again concerning another gas, is disposed on the box 13.

When the box 13 is connected to the sleeve 4, its gaseous content is sucked up by the vacuum pump 23 and then replaced by the nitrogen of the bottle 26. The pressure in the box 13 is adjusted to the desired value and the measurement consists of monitoring the evolution of the oxygen concentration from a zero value. The speed of this evolution, which only depends on imperviousness defects it is desired to test, is proportional to the leak flow through the glove 8. From this, it is possible to therefore deduce whether the glove 8 and its mounting possess sufficient quality.

What is claimed is:

1. Device for testing the imperviousness of a flexible membrane installed through an opening of a collar, said device comprising a box equipped with a neck to be engaged in the collar, the neck including a gasket against the collar and an opening situated in front of the membrane when the neck is engaged, a device for varying the pressure in the box, and a device for measuring the gaseous contents of the box.

2. An imperviousness test device according to claim 1, wherein said neck includes two grooves joined side by side to receive a movable elastic joint able to jump from one groove to the other groove.

3. An imperviousness test device according to claim 1, wherein said pressure variation device is a vacuum pump.

4. An imperviousness test device according to claim 3, wherein said measuring device is a device for analyzing a gas present above the membrane.

5. An imperviousness test device according to claim 4, further comprising a device for injecting a gas into the box.

6. An imperviousness test device according to claim 5, wherein said analyzing device analyzes the presence of oxygen and said injecting device injects nitrogen.

* * * * *

UNITED STATES PATENT AND TRADEMARK OFFICE
CERTIFICATE OF CORRECTION

PATENT NO. : 5,578,747
DATED : November 26, 1996
INVENTOR(S) : Nottingham et al.

It is certified that error appears in the above-indentified patent and that said Letters Patent is hereby corrected as shown below:

On title page, item [75], the
correct spelling for the city of the first inventor is as follows: --Villedieu Le Chateau, France--.

On title page, item [73], delete the information in item [73] and insert the following: --Sne La Calhene, Velizy-Villacoublay Cedex, France--.

Signed and Sealed this

Twenty-second Day of April, 1997

*Attest:*

BRUCE LEHMAN

*Commissioner of Patents and Trademarks*

*Attesting Officer*